US010203971B2

(12) United States Patent
Bao et al.

(10) Patent No.: US 10,203,971 B2
(45) Date of Patent: *Feb. 12, 2019

(54) COGNITIVE SCREEN SHARING WITH CONTEXTUAL AWARENESS

(71) Applicant: INTERNATIONAL BUSINESS MACHINES CORPORATION, Armonk, NY (US)

(72) Inventors: Sheng Hua Bao, San Jose, CA (US); Richard L. Martin, Jamaica Plain, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,994

(22) Filed: May 11, 2018

(65) Prior Publication Data

US 2018/0253324 A1    Sep. 6, 2018

Related U.S. Application Data

(63) Continuation of application No. 15/708,267, filed on Sep. 19, 2017, now Pat. No. 9,996,367, which is a
(Continued)

(51) Int. Cl.
*G06F 9/451* (2018.01)
*G06F 21/62* (2013.01)
(Continued)

(52) U.S. Cl.
CPC .............. *G06F 9/452* (2018.02); *G06F 3/048* (2013.01); *G06F 3/14* (2013.01); *G06F 3/1454* (2013.01);
(Continued)

(58) Field of Classification Search
CPC ...................................................... G06F 3/048
See application file for complete search history.

(56) References Cited

U.S. PATENT DOCUMENTS 9,141,332 B2    9/2015   Coleman et al.
9,361,469 B2    6/2016   Thiyagarajan et al.
(Continued)

OTHER PUBLICATIONS

IBM: List of IBM Patents or Patent Applications Treated as Related (Appendix P), May 18, 2018, pp. 1-2.
(Continued)

*Primary Examiner* — Pei Yong Weng
(74) *Attorney, Agent, or Firm* — Michael O'Keefe (57) ABSTRACT

A method for cognitive screen sharing protection is provided. The method may include, in determining a screen sharing session of a client computing device associated with a user has been initiated, receiving, by a processor, a plurality of pertinent state data associated with the client computing device. The method may also include assigning an initial binary status to at least one display window of at least one open application on the client computing device. The method may further include, in determining a change has occurred to the screen sharing session, updating each assigned binary status. The method may also include detecting an undesirable sharing situation on the client computing device based on the updated binary status of the at least one display window. The method may further include performing a precautionary action based on the detected undesirable sharing situation.

1 Claim, 5 Drawing Sheets

Related U.S. Application Data continuation of application No. 15/410,980, filed on Jan. 20, 2017.

(51) Int. Cl.
  *G06F 3/14*     (2006.01)
  *G06F 3/048*    (2013.01)
  *G06F 8/71*     (2018.01)

(52) U.S. Cl.
  CPC ............... *G06F 8/71* (2013.01); *G06F 9/451* (2018.02); *G06F 21/629* (2013.01); *G06F 21/6245* (2013.01)

(56) References Cited

U.S. PATENT DOCUMENTS

| | | |
|---|---|---|
| 9,699,271 B2 | 7/2017 | Brander et al. |
| 2006/0002315 A1 | 1/2006 | Theurer et al. |
| 2008/0282356 A1 | 11/2008 | Grabarnik et al. |
| 2012/0036452 A1 | 2/2012 | Coleman et al. |
| 2013/0007895 A1 | 1/2013 | Brolley et al. |
| 2014/0215356 A1 | 7/2014 | Brander et al. |
| 2015/0278534 A1 | 10/2015 | Thiyagarajan et al. |

OTHER PUBLICATIONS

Bao et al., "Cognitive Screen Sharing With Contextual Awareness" Pending U.S. Appl. No. 15/977,002, filed May 11, 2018, pp. 1-32.

Mell et al., "The NIST Definition of Cloud Computing," National Institute of Standards and Technology, Sep. 2011, p. 1-3, Special Publication 800-145.

Pending U.S. Appl. No. 15/708,267, filed Sep. 19, 2017, titled "Cognitive Screen Sharing With Contextual Awareness", pp. 1-32.

Pending U.S. Appl. No. 15/410,980, filed Jan. 20, 2017, titled "Cognitive Screen Sharing With Contextual Awareness", pp. 1-36.

FIG. 5

COGNITIVE SCREEN SHARING WITH CONTEXTUAL AWARENESS

BACKGROUND

The present invention relates, generally, to the field of computing, and more particularly to screen sharing.

Screen sharing is a modern computing technology that allows for remote observance of a user's display screen by other users. Screen sharing may be utilized by users when engaged in various group activities, such as meetings or presentations, or one-on-one user interactions, such as information technology support sessions. In some screen sharing instances, the sharing user may allow a remote user to interact or collaborate on the shared screen by granting permissions to the remote user.

SUMMARY

According to one embodiment, a method for cognitive screen sharing protection is provided. The method may include, in determining a screen sharing session of a client computing device associated with a user has been initiated, receiving, by a processor, a plurality of pertinent state data associated with the client computing device. The method may also include assigning an initial binary status to the screen sharing session and at least one display window of at least one open application on the client computing device. The method may further include, in determining a change has occurred to the screen sharing session, updating each assigned binary status. The method may also include detecting an undesirable sharing situation on the client computing device based on the updated binary status. The method may further include performing a precautionary action based on the detected undesirable sharing situation.

According to another embodiment, a computer system for cognitive screen sharing protection is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in determining a screen sharing session of a client computing device associated with a user has been initiated, receiving a plurality of pertinent state data associated with the client computing device. The method may also include assigning an initial binary status to the screen sharing session and at least one display window of at least one open application on the client computing device. The method may further include, in determining a change has occurred to the screen sharing session, updating each assigned binary status. The method may also include detecting an undesirable sharing situation on the client computing device based on the updated binary status. The method may further include performing a precautionary action based on the detected undesirable sharing situation.

According to yet another embodiment, a computer program product for cognitive screen sharing protection is provided. The computer program product may include one or more computer-readable storage devices and program instructions stored on at least one of the one or more tangible storage devices, the program instructions executable by a processor. The computer program product may include, in determining a screen sharing session of a client computing device associated with a user has been initiated, program instructions to receive a plurality of pertinent state data associated with the client computing device. The computer program product may also include program instructions to assign an initial binary status to the screen sharing session and at least one display window of at least one open application on the client computing device. The computer program product may further include, in determining a change has occurred to the screen sharing session, program instructions to update each assigned binary status. The computer program product may also include program instructions to detect an undesirable sharing situation on the client computing device based on the updated binary status. The computer program product may further include program instructions to perform a precautionary action based on the detected undesirable sharing situation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to screen sharing. The following described exemplary embodiments provide a system, method, and program product to, among other things, modify the content displayed during a user's shared screen session based on historical user information, meeting information associated with the current screen sharing session, and user interactions by the screen sharing user that change the displayed information on the sharing user's computing device. Therefore, the present embodiment has the capacity to improve the technical field of screen sharing by cognitively learning specific information that viewers of a screen sharing session may not be authorized to observe and filtering the confidential information (e.g. blocking a display window from appearing) from the unauthorized viewers display.

As previously described, screen sharing is a modern computing technology that allows for remote observance of a user's display screen by other users. Screen sharing may be utilized by users when engaged in various group activities, such as meetings or presentations, or one-on-one user interactions, such as information technology support sessions. In some screen sharing instances, the sharing user may allow a remote user to interact or collaborate on the shared screen by granting permissions to the remote user.

In the modern communication ecosystem, the sharing of static materials, such as images or presentation decks by email, may frequently be replaced by the ability of an individual to share, in real-time over a network, the current state of a computer display screen with another individual. For example, a salesperson may share a computer screen with executives at a potential client organization in order to give a real-time product demonstration. Similarly, a researcher may collaborate with team members, management, or external entities by presenting the latest data results of an experiment. Additionally, a financial specialist or chief executive officer may share earnings reports and other financial data with external investors.

In any context, the real-time transmission of a computer display screen provides significant potential for accidental or otherwise unintended transmission of sensitive information. For example, during the course of a real-time screen sharing session, an instant messaging client may present an incoming message to the foreground of the display, minimization or movement of a display window may reveal another running application in the background, or failure to terminate a screen sharing session after a meeting has completed may result in inadvertent broadcast of subsequent computer usage activities and data. Inadvertent transmission of information caused by the prevailing insecure screen sharing protocols may be a common occurrence for some users. While, in some cases, such disclosure may be simply embarrassing, in other situations, highly sensitive company data, such as confidential business information, or confidential individual information, such as personal health information or personally identifiable information, may be revealed. As such, it may be advantageous to, among other things, implement a system that cognitively determines the individuals participating in a screen sharing session and the state of the sharing user's device so highly sensitive information may be filtered from view should one or more viewers of the screen sharing session not be authorized to observe the disclosed information, or should this sharing simply not be desired by the presenter.

According to one embodiment, the content of a real-time screen sharing transmission may be automatically controlled according to a model that is based on historical user information (e.g., previous user actions) and meeting information (e.g., screen sharing session participants). The present embodiment may be capable of tracking active materials within a computer display (e.g., open or minimized program display windows), identify which active materials are currently being transmitted (e.g., active program display windows in the foreground of a shared computer display), and determine the specific metadata related to the screen sharing session (e.g., number of participants and audio activity). Automatically controlling the screen sharing session may include interrupting the screen share, filtering the computer display contents being shared, and terminating a screen sharing session without requiring user intervention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a model based on historical user information and meeting information that is capable of automatically modifying the contents of a computer display screen shared during a screen sharing session.

Figure 1:
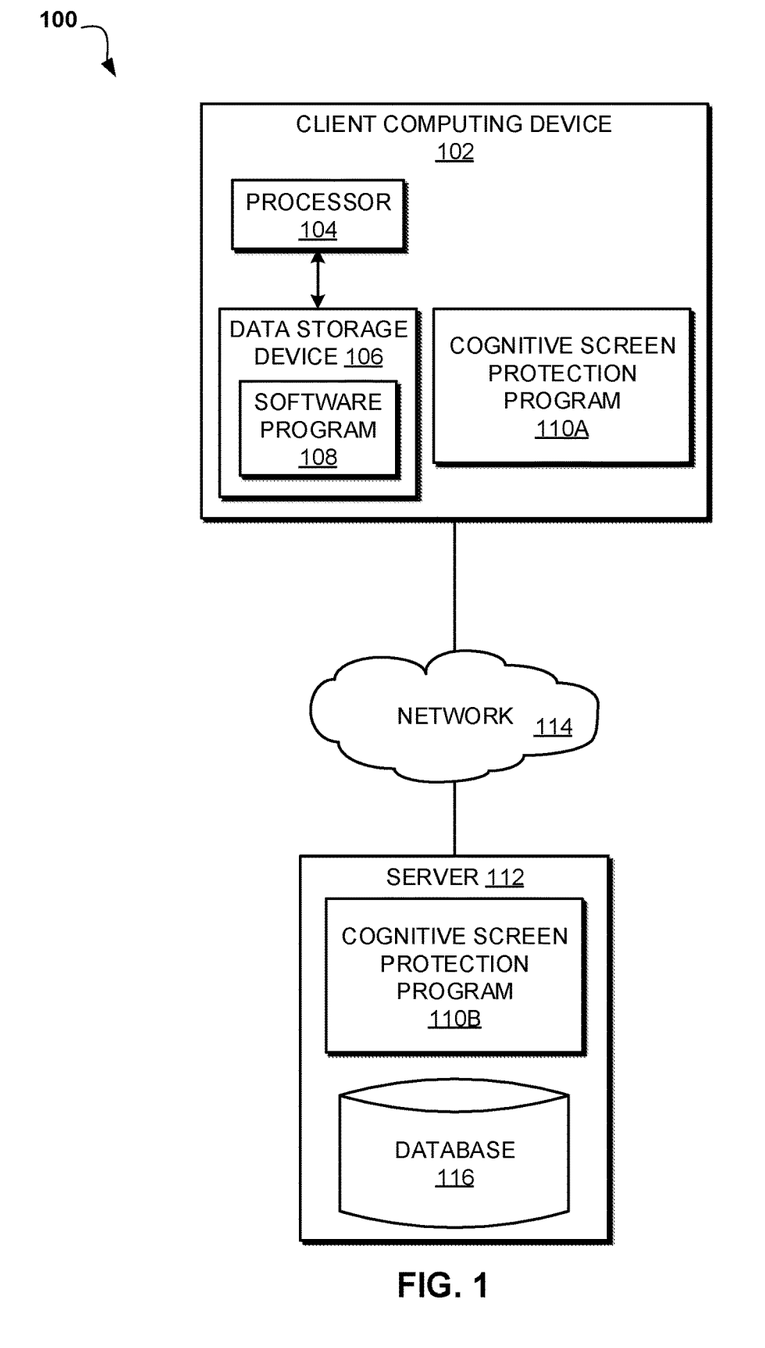
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cognitive screen protection program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a cognitive screen protection program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cognitive screen protection program 110A, 110B may be a program capable of analyzing pertinent state data for a client computing device 102 and determining if any undesirable data is depicted on the display screen which any participants to a screen sharing session should not be able to view. Once undesirable data is identified, the cognitive screen protection program 110A, 110B may be capable of performing a precautionary action that prevents the undesirable data from being observed by the screen sharing session participants. The cognitive screen protection method is explained in further detail below with respect to FIG. 2.

Figure 2:
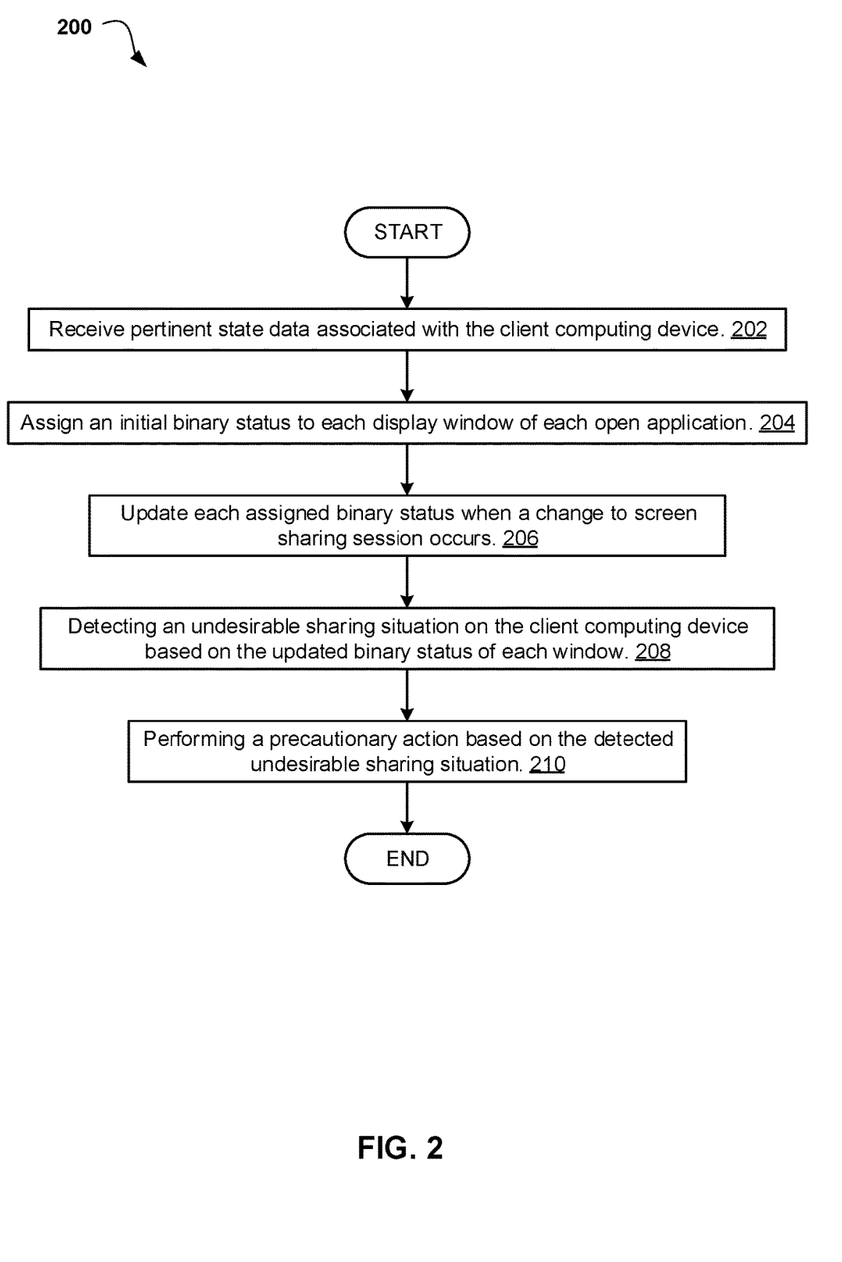
FIG. 2 is an operational flowchart illustrating a cognitive screen protection process according to at least one embodiment.

Referring now to FIG. 2, an operational flowchart illustrating a cognitive screen protection process 200 is depicted according to at least one embodiment. At 202, the cognitive screen protection program 110A, 110B may receive pertinent state data associated with the client computing device 102. The pertinent state data may include the current full content of the user's computer display screen, a complete list of all active applications and display windows of each active application, the number of remote participants in the screen sharing session, the sharing user's audio communication history across the network 114, the other participants' audio communication history across the network 114, and the user's peripheral device activity history (e.g., mouse, keyboard, and web camera). With respect to the complete list of all active applications and the display windows for each active application, the cognitive screen protection program 110A, 110B may also consider whether a window is an active component on the user's computer display (e.g., where a current keyboard entry would be processed), whether the window is accessed in the construction of the display or simply minimized in the system tray, the position and size of each application display window, whether the window contains any elements of transparency, and whether the window is specified by the user to be safe for transmission across the network 114.

Next, at 204, the cognitive screen protection program 110A, 110B may assign an initial binary status to each display window of each open application. The cognitive screen protection program 110A, 110B may use the assigned binary status to determine whether to display a display window on the user's computer display during a screen sharing session without filtering any content depicted on the display window. The binary status may be a value determined by the sensitivity of the data displayed within a display window. For example, a display window with a low value binary status may be displayed to all participants of a screen sharing session. Conversely, a display window with a high value binary status may not be viewed by any participants of a screen sharing session. The cognitive screen protection program 110A, 110B may calculate the binary status to be assigned to each display window using the received pertinent state data. Furthermore, the cognitive screen protection program 110A, 110B may use machine learning techniques and rule-based methods to cognitively determine the binary status for each display window using the pertinent state data.

Additionally, the binary status may be used by the cognitive screen protection program 110A, 110B to detect a situation in which any sharing with screen sharing session participants is undesired, such as when the time period for screen sharing has expired or terminated, the sharing user is no longer paying attention to the screen share, and when screen sharing was inadvertently commenced. The cognitive screen protection program 110A, 110B may detect such situations through the pertinent state data and as determined through machine learning and rules-based techniques. For example, the cognitive screen protection program 110A, 110B may determine there is a sustained period of no incoming or outgoing audio communication, a sustained period of no incoming communications, the sharing user is communicating with a third party not participating in the screen sharing session, a significant reduction in the number of screen sharing session participants occurs, or the user's presence is not detected by an input peripheral (e.g., a webcam does not detect the user's face in a detection zone or a preconfigured period of time has elapsed without mouse or keyboard interaction). In such situations, all display windows may be assigned a high value binary status and the screen sharing session may be terminated or all active display windows may be filtered to remove highly sensitive content.

Furthermore, the binary status may be used by the cognitive screen protection program 110A, 110B to detect a situation in which sharing of a particular item depicted on the computer display is undesired, such as when a display window, either automatically or manually, comes to the foreground of the computer display that contains highly sensitive data to which the screen sharing session participants may not be privy. Similar to situations when the cognitive screen protection program 110A, 110B determines any sharing is undesired, the cognitive screen protection program 110A, 110B may detect a situation in which sharing of a particular depicted item is undesired using the received pertinent state data. For example, the cognitive screen protection program 110A, 110B may determine the sharing of a particular depicted item is undesirable when a user receives an instant message notification from a supervisor that includes personally identifiable information for a coworker. The cognitive screen protection program 110A, 110B may assign a high value binary status to the instant message notification as it appears and filter the contents of the notification from the screen sharing session participants view.

Then, at 206, the cognitive screen protection program 110A, 110B may update each assigned binary status when a change to the screen sharing session occurs. As the sharing user performs interactions with the graphical user interface of the client computing device 102, participants join and leave the screen sharing session, and open applications, such as software application 108, perform operations, the information displayed to the participants and the status of the screen sharing session may change. For example, a severe decrease in the number of participants may indicate the screen sharing session has ended but the host user failed to terminate screen sharing. As such, the binary status of the display windows may be updated using the received pertinent status data.

Next, at 208, the cognitive screen protection program 110A, 110B may detect an undesirable sharing situation on the client computing device 102 based on the updated binary status for each window. For example, if a display window originally received a low value binary status since no highly sensitive information was present within the display window, the cognitive screen protection program 110A, 110B may not filter any information within the display window and allow all screen sharing session participants to view the displayed information. However, if the sharing user types confidential information into the originally low value binary status display window, the cognitive screen protection program 110A, 110B may recalculate the binary status of the display window and assign a high value binary status that requires the display window to be filtered from the screen sharing session participants view. The cognitive screen protection program 110A, 110B may detect the undesirable sharing situation through a variety of approaches, such as rule-based methods or machine learning methods.

Then, at 210, the cognitive screen protection program 110A, 110B may perform a precautionary action based on the detected undesirable sharing situation. Once the cognitive screen protection program 110A, 110B determines an undesirable sharing situation has occurred, the cognitive screen protection program 110A, 110B may automatically take a predetermined precautionary action without requiring user involvement. The precautionary action performed by the cognitive screen protection program 110A, 110B may include terminating the screen sharing session, filtering the specific undesired content from the data being transmitted to participants of the screen sharing session, and pausing the screen sharing session immediately prior to the undesirable sharing situation being transmitted to participants. The user may preconfigure preferences related to the precautionary action by manually adjusting a settings menu in the cognitive screen protection program 110A, 110B.

If the cognitive screen protection program 110A, 110B filters the undesirable content prior to transmission to participants, the filtration may be in the form of a single color-obscuring region being overlaid on a particular portion of a display window or the display screen. Such filtration of the undesired data may enable a real-time transmission of the desired content to continue.

If the cognitive screen protection program 110A, 110B pauses the screen sharing session, a static image rendering of the most recent display state prior to the undesired content's appearance may be transmitted to participants. Although real-time transmission of the desired content is prevented under this precautionary action, such action may be preferable to filtration of the undesired content when the undesired content is very large in proportion to the entire display which may result in the entire filtration of the transmitted display. Similarly, pausing the transmission may be preferable to filtration of undesirable content when the desired content is in a static state, such as during a slide show presentation without animation or slide changes.

In at least one embodiment, the cognitive screen protection program 110A, 110B may remove the performed precautionary action once the undesirable sharing situation has ended. For example, if the cognitive screen protection program 110A, 110B filtered out an instant message window containing highly sensitive information by overlaying the instant message display window with a black box, the cognitive screen protection program 110A, 110B may remove the black box from the transmission to screen sharing session participants when the sharing user exits or minimizes the instant message display window. Similarly, if the cognitive screen protection program 110A, 110B paused the screen sharing session when the instant message was received, the cognitive screen protection program 110A, 110B may resume the transmission to participants when the sharing user exits or minimizes the instant message display window.

It may be appreciated that FIG. 2 provides only an illustration of one implementation and does not imply any limitations with regard to how different embodiments may be implemented. Many modifications to the depicted environments may be made based on design and implementation requirements. For example, the cognitive screen protection program 110A, 110B may be capable of identifying each participant to the screen sharing session and the privileges each participant holds in relation to the host user. In the event undesirable information is presented on the host user's display screen for transmission to participants, the cognitive screen protection program 110A, 110B may filter the undesired information to participants not authorized to see such information but not filter and transmit the information to participants authorized to see such information, such as the host user's supervisor.

As a more detailed example of at least one embodiment, a user may join a web conference in which various other users are already logged in. The user may initiate a screen sharing session to share the user's entire computer display. The cognitive screen protection program 110A, 110B may observe the screen sharing session has been requested and may observe the current status of the user's display as well as the pertinent data of the meeting, such as the number of potential recipients of the data, the audio traffic, and the present duration of the meeting. Based on previous instances of users choosing to allow transmission of web browsers at a very early stage in a meeting with little audio communication, the cognitive screen protection program 110A, 110B may predict a very high likelihood of this transmission being desired and may automatically permit the transmission of the browser rather than block the transmission as a user error in inadvertently selecting to screen share. The recipients then begin to receive a transmission of the user's view of the web meeting.

During the course of the meeting, the user may minimize the full screen browser window revealing numerous screen contents, such as a slide show presentation which is the active display component, a portion of the user's email inbox, and a portion of the computer desktop. Based on this user action and the pertinent data, the cognitive screen protection program 110A, 110B may predict a low likelihood of desired transmission for the desktop and user's email inbox and may create a local copy of the user's display where these components have been obscured by a solid color. The cognitive screen protection program 110A, 110B may provide a button in the sharing user's display that is visible only to the sharing user, which indicates that these components of the display are not being transmitted to screen share participants. However, the cognitive screen protection program 110A, 110B may allow the sharing user to overrule the decision and begin transmission of the components. In this process, the recipients observe a smooth transition from the full screen web browser to the modified version of the user's display that includes a slide show presentation as the active display component surrounded by solid color.

Thereafter, the sharing user may instruct the slide show presentation software to begin full screen presentation mode. The cognitive screen protection program 110A, 110B may process the new content of the display and update the pertinent state data concerning the meeting and may predict a very high likelihood of this being information desired for transmission. Therefore, the cognitive screen protection program 110A, 110B may take no action and the recipients may begin to receive the transmission of the presentation.

During the presentation, a viewer of the screen sharing session may ask a question to the sharing user. The sharing user may switch the focus of the display from the presentation to a text editor that allows the user to type and review notes. The cognitive screen protection program 110A, 110B may parse the pertinent data, particularly the change in audio traffic status and screen content, to determine if a moderate likelihood exists that the sharing user intends for the text editor to be transmitted to viewing users. If the cognitive screen protection program 110A, 110B determines the likelihood is too low for automatic transmission to the viewing users, the cognitive screen protection program 110A, 110B may transmit a static image of the previous state of the sharing user's screen (i.e., the slide show presentation). The cognitive screen protection program 110A, 110B may display a button on the graphical user interface of the sharing user's client computing device 102 that is only visible to the sharing user and allows the sharing user the option to transmit the text editor display window to the viewing users.

Additionally, before answering the viewer's question, the sharing user may switch focus again to a spreadsheet that contains evidentiary information helpful to answering the viewer's question. The cognitive screen protection program 110A, 110B may process the situation and determine a moderate likelihood that the sharing user intends to transmit the data contained within the spreadsheet. Therefore, the cognitive screen protection program 110A, 110B may continue to transmit a static image of the presentation rather than the image of the spreadsheet. However, when the cognitive screen protection program 110A, 110B presents the user with a dialog box allowing the user to override the automatic decision to not transmit the spreadsheet window to the viewing users, the sharing user may decide to override the automatic decision and transmit the current view of the sharing user's display.

Once the static image is overridden, the cognitive screen protection program 110A, 110B may transmit the sharing user's display containing the spreadsheet window surrounded by a solid color so as to block any sensitive information contained within the window. The user may decide that the information within the spreadsheet window is safe for transmission to viewing users and override the obscuration of the spreadsheet presentation. The user decisions to override the spreadsheet obscuration are tracked and analyzed by the cognitive screen protection program 110A, 110B through known machine learning techniques that allow the cognitive screen protection program 110A, 110B to determine future user interactions that may warrant protection.

Then, at the end of the sharing user's presentation, the sharing user may not terminate the screen sharing session. However, the cognitive screen protection program 110A, 110B may detect a change in the audio transmissions and a sharp drop in the number of viewers as viewing users leave the session. If the cognitive screen protection program 110A, 110B detects the sharing user change the display to focus on the sharing user's email inbox, the cognitive screen protection program 110A, 110B may determine that the screen sharing session should be terminated since there is a high likelihood that the meeting for which the screen sharing session was initiated has concluded. Additionally, the cognitive screen protection program 110A, 110B may present the sharing user with a dialog box that allows the sharing user to override the screen sharing session termination determination should the decision to end the screen sharing session by the cognitive screen protection program 110A, 110B be incorrect.

Figure 3:
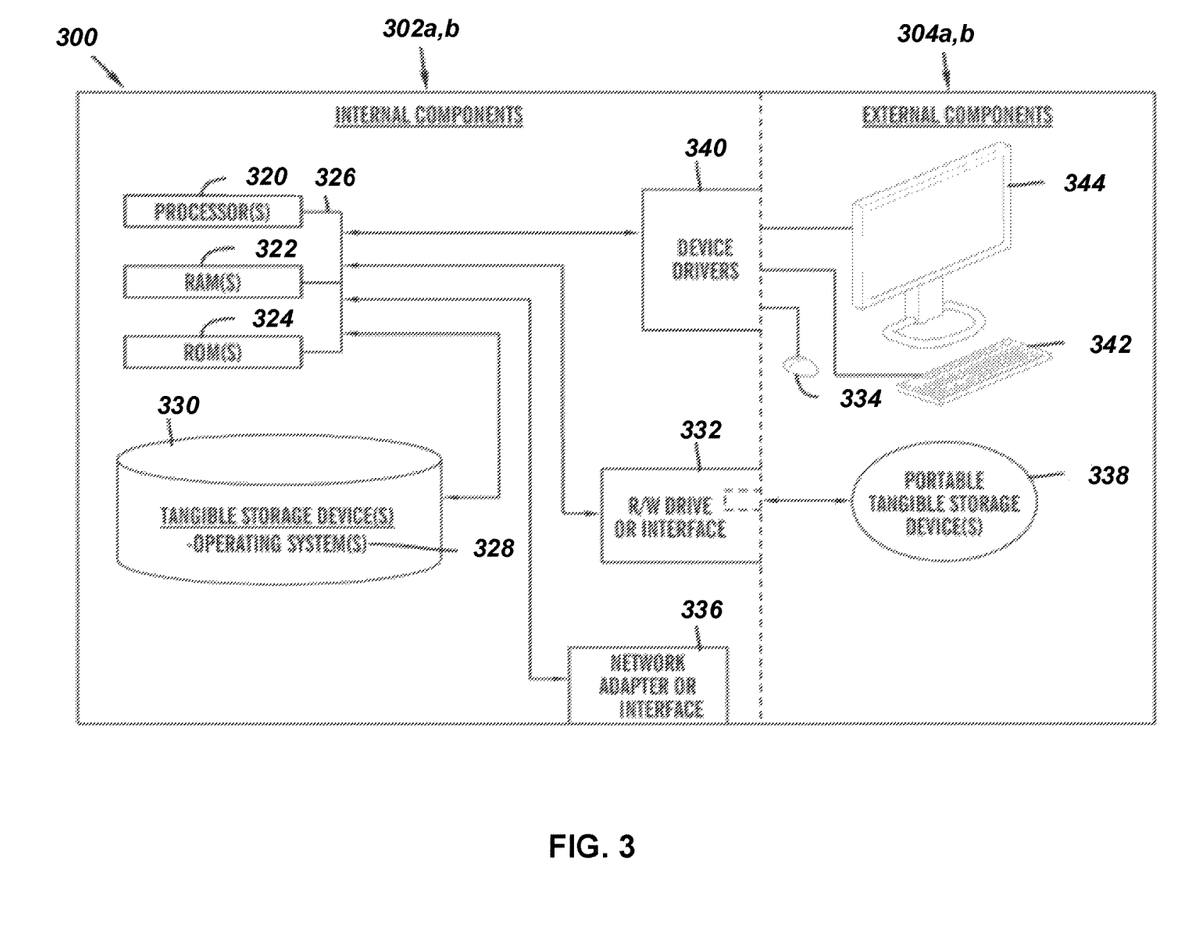
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the cognitive screen protection program 110A in the client computing device 102, and the cognitive screen protection program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the cognitive screen protection program 110A in the client computing device 102 and the cognitive screen protection program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the cognitive screen protection program 110A in the client computing device 102 and the cognitive screen protection program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
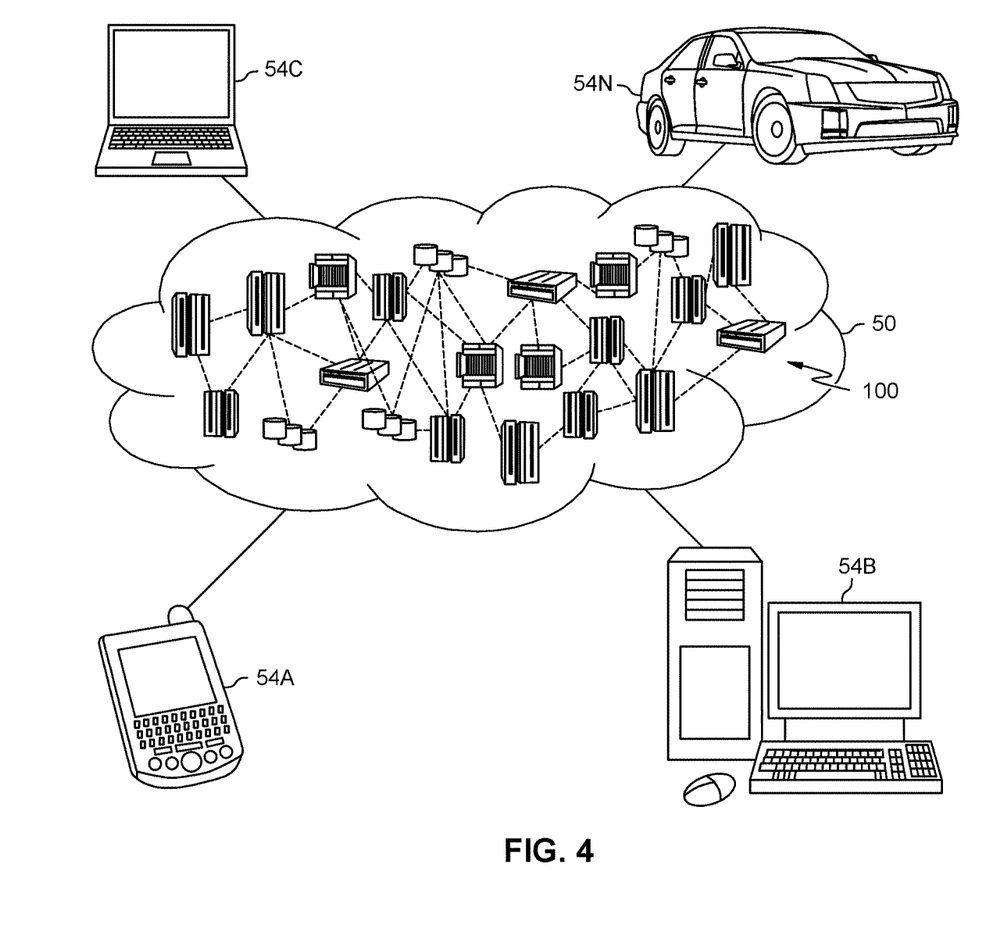
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
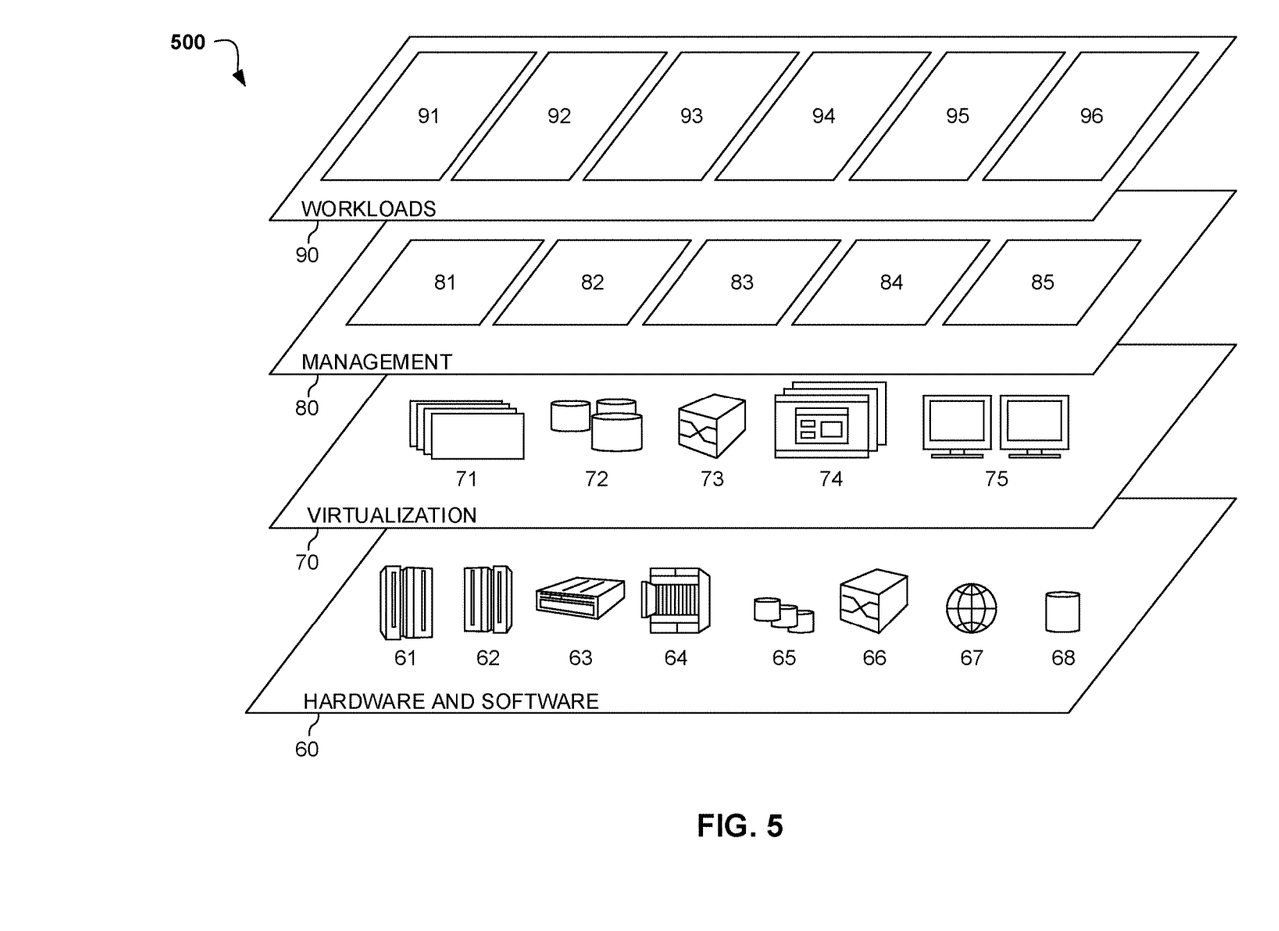
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive screen protection 96. Cognitive screen protection 96 may relate to analyzing data pertinent to the state of a user's client computing device 102 to determine when highly sensitive information is being displayed that should not be shared with viewers of a screen sharing session and taking preventative actions to prevent the sensitive information from being disseminated to the screen sharing session viewers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for cognitive screen sharing protection, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
in determining a screen sharing session of a client computing device associated with a user has been initiated, receiving, by a processor, a plurality of pertinent state data associated with the client computing device, wherein the plurality of pertinent state data is selected from a group consisting of a plurality of current full content of a computer display screen of the client computing device, a complete list of a plurality of active applications, a plurality of display windows associated with each of the plurality of active applications, a total number of a plurality of remote participants in the screen sharing session, an audio communication history associated with the user across a network, an audio communication history associated with the plurality of remote participants across the network, and a peripheral device activity history associated with the user, and wherein each window within the plurality of display windows includes a plurality of state information, and wherein the plurality of state information is selected from a group consisting of whether a window is an active component of the computer display screen, whether the window is accessed in the construction of the display or minimized in a system tray, a position and a size of each applicant display window, whether a window contains any element of transparency, and whether a window is specified as safe for transmission by the user;
assigning an initial binary status to the screen sharing session and to each at least one display window of at least one open application on the client computing device, wherein the initial binary status indicates whether the at least one display window on the computer display screen should be visible during the screen sharing session without filtering any content, and wherein the initial binary status is determined by a sensitivity of data displayed within the at least one display window using the received plurality of pertinent state data, one or more machine learning techniques, and one or more rule-based methods;
in determining a change has occurred to the screen sharing session, updating each assigned binary status;
detecting a plurality of confidential information is displayed on the computer display screen of the client computing device based on the updated binary status; and
pausing the screen sharing session immediately prior to the detected undesirable sharing situation being transmitted to the plurality of participants based on the detected undesirable sharing situation.

\* \* \* \* \*